Nov. 16, 1943. J. B. WHITNEY 2,334,663
SEAL FOR ROTARY KILNS
Filed Jan. 24, 1941

John B. Whitney
INVENTOR.
BY Charles F. Kaegeleh

Patented Nov. 16, 1943

2,334,663

UNITED STATES PATENT OFFICE 2,334,663

SEAL FOR ROTARY KILNS

John Boardman Whitney, Highland Park, N. J., assignor to National Lead Company, New York, N. Y., a corporation of New Jersey Application January 24, 1941, Serial No. 375,760

2 Claims. (Cl. 285—9)

The present invention relates to rotary kilns, or furnaces, and has special reference to an improved seal for preventing the escape of dust and gases between the rotating and stationary surfaces of such furnaces.

Rotary furnaces, as is known, consist essentially of a hollow rotatable drum or shell having at one end a stationary combustion chamber and at the other a stationary stack hood. It will be appreciated that the prevention of the escape of dust and fumes between the stationary and moving surfaces constitutes a problem in the operation of such furnaces. Prior to the present invention, rotary furnaces have been equipped with elaborate and expensive sealing devices designed to overcome this problem. Such devices consisted of a metal ring fixed upon and moving with the rotary shell in contact with a second stationary metal ring fixed to a stationary part of the furnace. Thus, the seal was effected by a contact of metal upon metal with resultant wear and consequent rapid and considerable escape of dust and fumes through the sealing device. Maintenance costs for such devices were naturally high and moreover, the escape of hot gases and dust represented a loss of heat and the friction developed between the metal surfaces of the sealing devices necessitated added power consumption. The present invention constitutes a simple and economical means for overcoming the disadvantages inherent in the seal devices of the prior art.

Figure 1:
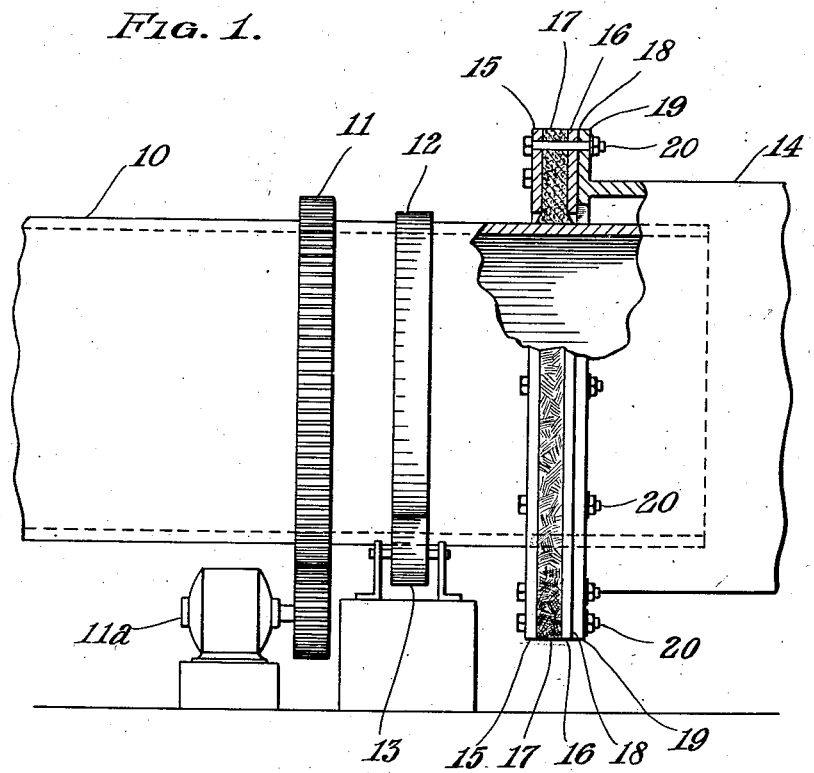

Fig. 1, which represents a preferred embodiment of the present invention, is a side elevation of one end of a rotary kiln provided with an improved seal of the present invention. A portion of the rotating shell and the seal has been cut away to present a cross-sectional view.

Figure 2:
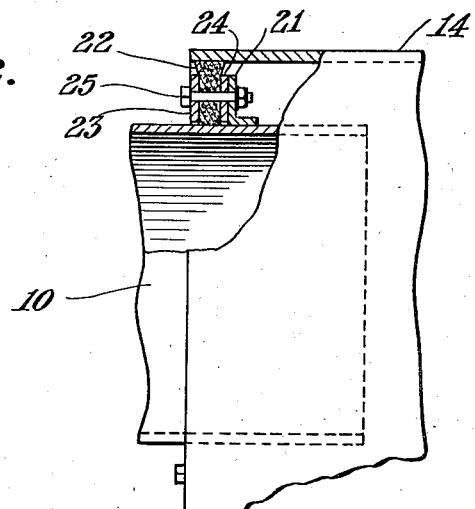

Fig. 2 is a representation of a second embodiment of the invention. Reference numeral 10 (Figs. 1 and 2) is the hollow rotatable shell of a rotary kiln provided with a geared ring 11 (Fig. 1) rigidly fixed around the circumference of the shell. The shell is rotated by means of the motor 11—a (Fig. 1), equipped with a geared drive wheel engaging the geared ring 11 (Fig. 1). The shell is also provided with a bearing ring 12 (Fig. 1) which rides upon support bearings 13 (Fig. 1). Reference numeral 14 (Figs. 1 and 2) represents one of the stationary ends of the kiln. This may be either the combustion chamber or the stack hood end. It will be seen that in operation the shell 10 rotates within the stationary part 14.

The preferred embodiment of the present invention as shown in Fig. 1 consists of a pair of flat rings or circular plates 15 and 16, which encircle the rotatable shell without touching the surface. These are positioned in a plane at right angles to the horizontal axis of the shell. Between these two rings 15 and 16 there is provided a packing of suitable material 17, which contacts the rotary shell. These rings and the packing between them are bolted by means of bolts 20 to a flange 19, rigidly attached to the stationary end member. This flange 19 may be, as shown in Fig. 1, an integral part of the stationary member or, if desired, it may be in the form of a separate piece affixed, as by welding, to the stationary member. Preferably a gasket 18 should be provided between the flange 19 and the ring 16.

The embodiment shown in Fig. 2 differs from that shown in Fig. 1 in that the flange 21 is affixed to the rotatable shell rather than the stationary member. In this embodiment the seal rotates with the shell in close contact with the surface of the stationary member and the packing material contacts the stationary end member.

The packing should be a material suitable to withstand the conditions under which the kiln is operated. For instance, where the kiln is operated at high temperatures and the dust and gases which are developed are of a corrosive nature, the packing should be both heat- and corrosion-resistant. The contact surface of the packing, in order most effectively to constitute a seal, ought not to be flat but rather made of individual strands, or bristles, which have a brushing action when the shell rotates. For this purpose, such materials as mineral wool, glass wool and asbestos fibers are especially suitable. These materials are, at the same time, heat- and corrosion-resistant. It will be seen, therefore, when such materials are employed in the present invention the fibrous materials should be placed between the rings so that the length of the fibers is at right angles to the horizontal axis of the shell.

As the contacting surface of the packing wears away as is evidenced by the escape of gas and fumes the seal is tightened by the simple expedient of taking up on the bolts. When the packing is finally used up it may be renewed by merely removing one or both rings and inserting a new packing.

The simple construction, ease of renewal, and efficient operation of the improved seals contribute to making the present invention a decided advance over prior art seals. It will be understood that the present invention is not to be limited as to structural details, but these may be modified in any convenient or desired manner without departing from the scope of the invention. In effect, as will be seen, the invention, in its broadest aspect, contemplates the provision of contractable means, i. e., means capable of being drawn together, affixed to either a stationary or rotatable member of a rotating kiln for holding a packing material in close contact with the other member to effect a seal against the escape of fumes and dust.

I claim:

1. An improved seal for rotary kilns comprising a pair of flat rings encircling the rotatable part of said kiln at right angles to the axis thereof but providing clearance between the rotatable and stationary parts of said kiln, a packing of fibrous, heat- and corrosion-resistant material held between said rings and effecting a friction seal between said rotatable and stationary parts of said kiln, said packing material being held between said rings by means transfixing said rings and packing material and affixing same to one of the parts of the kiln, said bolts being provided with nuts which upon tightening cause the said rings to exert a pressure upon said packing material thereby to tighten the friction seal, the rotatable and stationary parts of said kiln and said rings and the packing material being disposed in such relation that the friction seal is effected solely by means of said packing material while avoiding contact between the rotatable metal parts and the stationary metal parts.

2. An improved seal for rotary kilns comprising a pair of flat rings encircling the rotatable part of said kiln at right angles to the axis thereof but providing clearance between the rotatable and stationary parts of said kiln, a packing of fibrous, heat- and corrosion-resistant material held between said rings and effecting a friction seal between said rotatable and stationary parts of said kiln, said packing material being held between said rings by means of a plurality of threaded bolts transfixing said rings and packing material and affixing same to the stationary part of the kiln, said bolts being provided with nuts which upon tightening cause the said rings to exert a pressure upon said packing material thereby to tighten the friction seal, the rotatable and stationary parts of said kiln and said rings and the packing material being disposed in such relation that the friction seal is effected solely by means of said packing material while avoiding contact between the rotatable metal parts and the stationary metal parts.

JOHN BOARDMAN WHITNEY.